US009609315B2

United States Patent
Lu et al.

(10) Patent No.: US 9,609,315 B2
(45) Date of Patent: Mar. 28, 2017

(54) PROGRAM PRODUCTS FOR ITERATIVE QUANTIZATION RATE CONTROL IN VIDEO ENCODING

(75) Inventors: Ning Lu, Saratoga, CA (US); Hong Jiang, El Dorado Hills, CA (US); Atthar H. Mohammed, Folsom, CA (US); Satya N. Yedidi, Roseville, CA (US)

(73) Assignee: Intel Corporation, Santa Clara, CA (US)

( * ) Notice: Subject to any disclaimer, the term of this patent is extended or adjusted under 35 U.S.C. 154(b) by 784 days.

(21) Appl. No.: 13/994,307

(22) PCT Filed: Nov. 14, 2011

(86) PCT No.: PCT/US2011/060549
§ 371 (c)(1),
(2), (4) Date: Jun. 14, 2013

(87) PCT Pub. No.: WO2013/074064
PCT Pub. Date: May 23, 2013

(65) Prior Publication Data
US 2013/0272392 A1    Oct. 17, 2013

(51) Int. Cl.
*H04N 19/15* (2014.01)
*H04N 19/124* (2014.01)
(Continued)

(52) U.S. Cl.
CPC ....... *H04N 19/0009* (2013.01); *H04N 19/124* (2014.11); *H04N 19/15* (2014.11); *H04N 19/179* (2014.11); *H04N 19/192* (2014.11)

(58) Field of Classification Search
CPC .... H04N 19/15; H04N 19/124; H04N 19/179; H04N 19/192; H04N 19/146; H04N 19/102; H04N 19/0009
(Continued)

(56) References Cited

U.S. PATENT DOCUMENTS 5,317,397 A * 5/1994 Odaka .................. H04N 19/105
348/699
5,796,435 A * 8/1998 Nonomura ............. H04N 7/148
348/E7.082
(Continued)

FOREIGN PATENT DOCUMENTS

CN        1288336        3/2001
EP        1549074 A1    6/2005
(Continued)

OTHER PUBLICATIONS

International Preliminary Report on Patentability and Written Opinion received for PCT Patent Application No. PCT/US2011/060549, mailed on May 30, 2014, 6 pages.
(Continued)

*Primary Examiner* — Mohammed Rahaman
*Assistant Examiner* — Jimmy S Lee
(74) *Attorney, Agent, or Firm* — Green, Howard & Mughal, LLP

(57) ABSTRACT

Iterative video encoding systems, methods and computer program products, where residue quantization and data packing operations of an encoding process may be repeated with various values for a quantization parameter, without repeating the determination of macroblock prediction codes. In an embodiment, the size of an actual file generated by encoding is compared to a target file size. The QP may be adjusted depending on the amount by which these file sizes differ. The quantization and packing may then be repeated with the adjusted QP. In an embodiment, a greater difference in these file sizes results in a greater adjustment to the QP.

6 Claims, 8 Drawing Sheets

(51) Int. Cl.
H04N 19/179 (2014.01)
H04N 19/192 (2014.01)
(58) Field of Classification Search
USPC .................................................. 375/240.03
See application file for complete search history.

(56) References Cited

U.S. PATENT DOCUMENTS

| | | | | |
|---|---|---|---|---|
| 6,590,936 | B1* | 7/2003 | Kadono | H04N 19/61 |
| | | | | 375/240.03 |
| 8,045,821 | B2 | 10/2011 | Tasaka et al. | |
| 2004/0184534 | A1* | 9/2004 | Wang | H04N 19/147 |
| | | | | 375/240.03 |
| 2005/0175092 | A1 | 8/2005 | Puri et al. | |
| 2005/0226514 | A1* | 10/2005 | Getzinger | G06T 9/00 |
| | | | | 382/232 |
| 2008/0080620 | A1 | 4/2008 | Lee et al. | |
| 2008/0193028 | A1* | 8/2008 | Lan | H04N 19/593 |
| | | | | 382/244 |
| 2009/0310672 | A1 | 12/2009 | Rao et al. | |

FOREIGN PATENT DOCUMENTS

| | | |
|---|---|---|
| TW | 200814791 | 3/2008 |
| WO | 2013/074064 A1 | 5/2013 |

OTHER PUBLICATIONS

International Search Report and Written Opinion received for PCT Patent Application No. PCT/US2011/060549, mailed on Aug. 20, 2012, 9 pages.
European Search Report for EP Patent Application No. 11876029.7 issued on May 28, 2015.
Kodikara Arachchi, et al., "An intelligent rate control algorithm to improve the video quality at scene transitions for off-line MPEG-½ encoders", IEEE Transactions on Consumer Electronics, IEEE Service Center, vol. 49, No. 1, New York, NY, US, Feb. 1, 2003, pp. 210-219.
Mohsenian, N., et al., "Single-pass constant and variable-bit-rate MPEG-2 video compression", IBM Journal of Research and Development, International Business Machines Corporation, vol. 43, No. 4, New York, NY, US, Jul. 1, 1999, pp. 489-509.
Fan, X, et al., "Rate control algorithm based on scene change detection", Shanghai Jiaotong Daxue Xuebao, Journal of Shanghai Jiaotong University, Jiatong University Press, vol. 34, No. 6, Shanghai, China, Jun. 1, 2000, pp. 1006-2467.
First Office Action, mailed Sep. 9, 2016, for Chinese Patent Application No. 201180074837.5, no translation available.
English Translation of Search Report for Taiwan Patent Application No. 101141541, issued on May 23, 2016.

* cited by examiner

PROGRAM PRODUCTS FOR ITERATIVE QUANTIZATION RATE CONTROL IN VIDEO ENCODING

BACKGROUND

In video compression, there are typically requirements that need to be met regarding bandwidth and storage space. Depending on the available bandwidth and/or available storage space, the extent of the compression process may need to be varied. One of the variables that affects the extent of compression is the quantization parameter (QP). Encoding video frames using different QPs will result in different compression results. A lower QP may result in a larger file size, while a higher QP may result in a smaller file size.

As a result the encoding process may go through multiple iterations as it searches for the appropriate QP, i.e., the QP that will result in a desired file size. This may be a resource-intensive process. The number of machine cycles consumed in this iterative process may consume excessive time and power; while an acceptable file size may result, the process may be inefficient and costly.

BRIEF DESCRIPTION OF THE DRAWINGS/FIGURES

Figure 1:
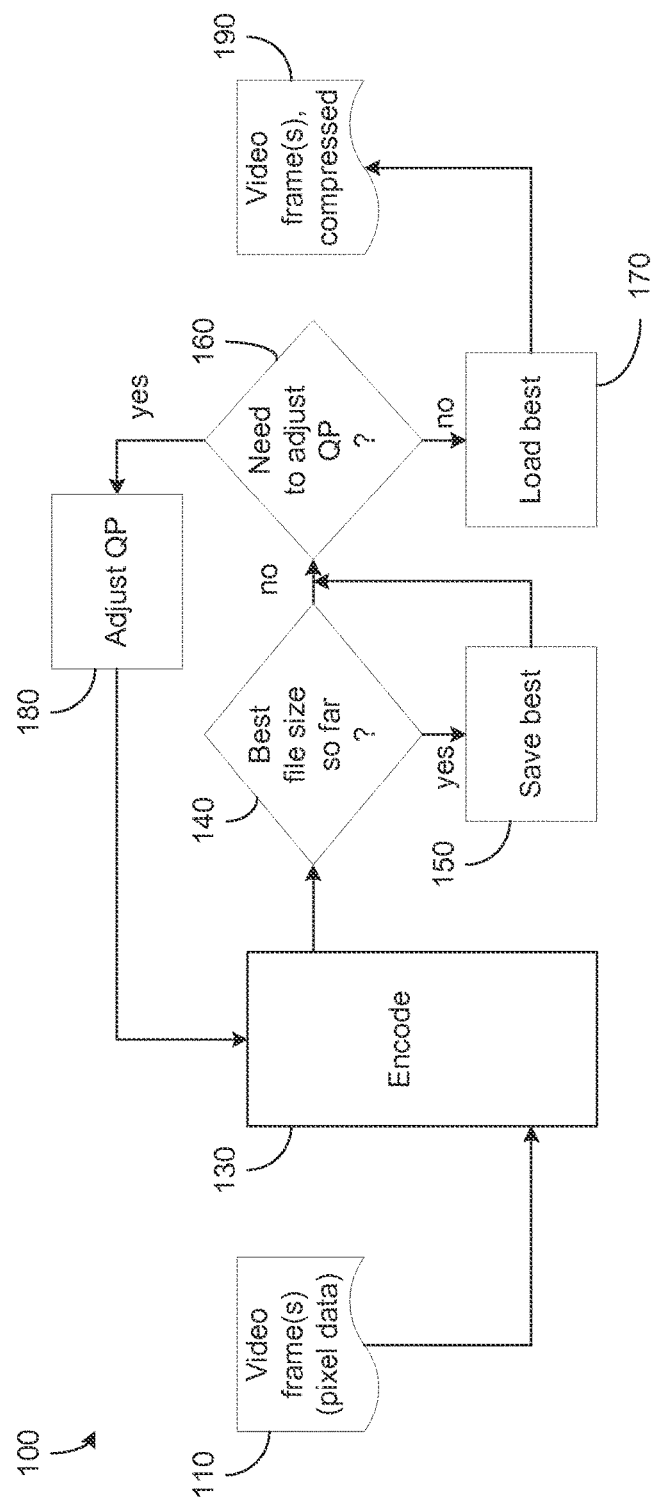
FIG. 1 is a block diagram illustrating an iterative video encoding process.

In the drawings, the leftmost digit(s) of a reference number identifies the drawing in which the reference number first appears.

DETAILED DESCRIPTION

An embodiment is now described with reference to the figures, where like reference numbers indicate identical or functionally similar elements. While specific configurations and arrangements are discussed, it should be understood that this is done for illustrative purposes only. A person skilled in the relevant art will recognize that other configurations and arrangements can be used without departing from the spirit and scope of the description. It will be apparent to a person skilled in the relevant art that this can also be employed in a variety of other systems and applications other than what is described herein.

The systems, methods and computer program products described herein may relate to an iterative video encoding process where, after the determination of one or more macroblock codes, the residue quantization and data packing operations of the encoding process may be repeated with various values for a quantization parameter (QP), without repeating the determination of macroblock prediction codes. In an embodiment, the size of an actual file generated by encoding is compared to a target file size. The QP may be adjusted depending on the amount by which these file sizes differ. The quantization and packing may then be repeated with the adjusted QP. In an embodiment, a greater difference in these file sizes results in a greater adjustment to the QP.

FIG. 1 illustrates an iterative encoding system. One or more video frames of pixel data 110 may be provided to an encoding process 130. The output of encoding process 130 may include a file having a particular size. At 140, a determination may be made as to whether the size of this file is the best so far. As would be understood by a person of skill in the art, a number of metrics may be applied to determine whether a particular file size is acceptable. In one example, the file size may be compared to a target file size; a file of a size that is closer to this target file size may be considered a better result. If the file that is output by encoding process 130 has the best frame size compared to other files that were previously output by encoding process 130 for video frame(s) 110, then this file may be saved at 150. Initially, the first file output may be treated as having the best size up to that point.

At 160, a determination may be made as to whether the quality parameter QP needs to be adjusted. A number of factors may be used in making such a determination, as will be described in greater detail below. If it is determined that the QP need not be adjusted further, then at 170, the file that was previously designated as having the best file size may loaded and output as one or more compressed video frames 190. If it is determined that the QP needs to be adjusted further, then this adjustment may be made at 180 and the encoding process 130 may he repeated using this new QP. The size evaluation process of 140 and the QP adjustment decision 160 may then repeat as necessary, until there is no further need to adjust the QP.

Figure 2:
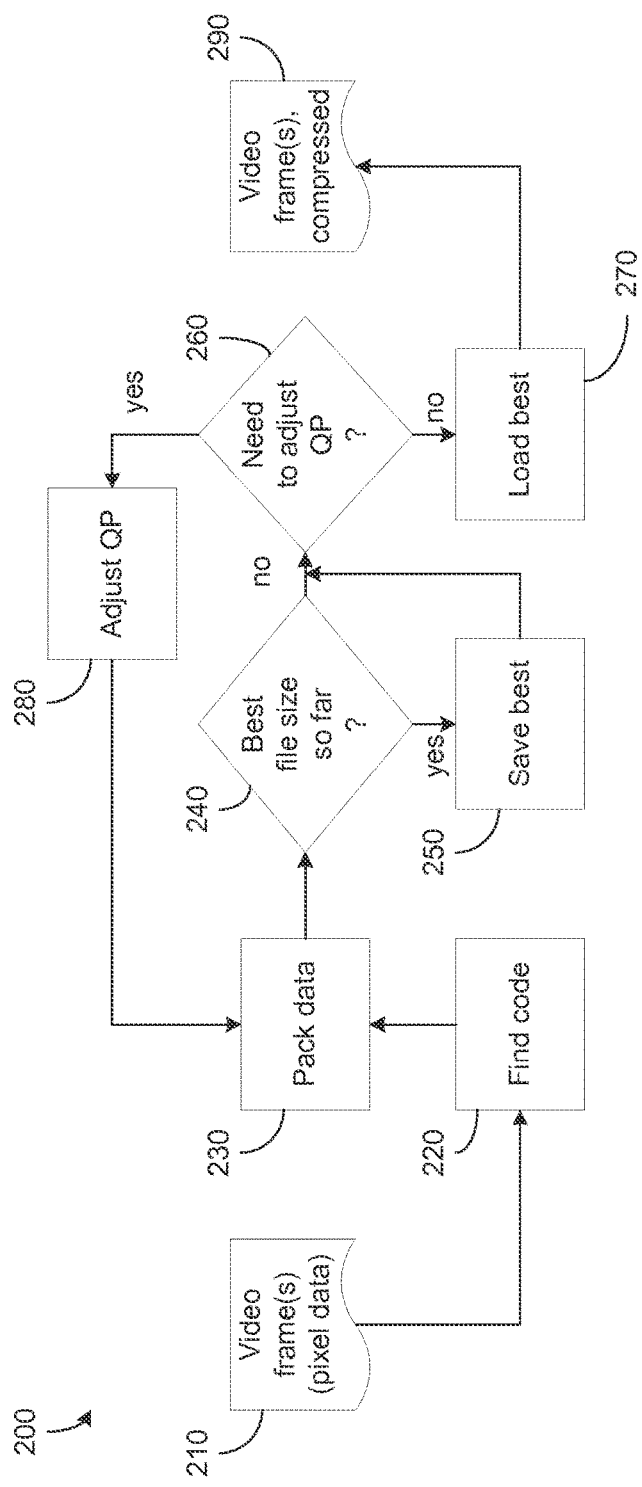
FIG. 2 is a block diagram illustrating an iterative video encoding process according to an embodiment.

FIG. 2 illustrates an encoding system according to an embodiment. One or more video frames of pixel data 210 may be provided to an encoding process. In the illustrated embodiment, the encoding process may include logic 220 that searches for and determines one or more macroblock MB prediction codes. The encoding process may also include logic 230, which calculates and quantizes the remaining residue data, and packs this data into a bitstream. In an embodiment, this packing may employ entropy coding. The output of 230 may include a file having a particular size. At 240, a determination may he made as to whether the size of this file is the best so far. As in the case of FIG. 1, a number of metrics may be applied to determine whether a particular file size is acceptable. In one example, the file size may be compared to a target file size; a file size that is closer to this target file size may be considered a better result. If the file that is output by 230 has the best frame size compared to other files previously output, then this file may be saved at 250.

At 260, a determination may be made as to whether the QP needs to be adjusted. If it is determined that the QP need not be adjusted further, then at 270, the file previously designated as having the best file size may be loaded and output as one or more compressed video frames 290. If it is determined that the QP needs to be adjusted further, then this adjustment may be made at 280 and the packing process 230 is repeated using this new QP, generating a next file. Note that the determination of one or more macroblock prediction codes may not need to be repeated. This may result in a significant savings of computational effort. A determination may be made at 240 as to whether this next file has the best frame size so far. The process may then repeat as described above. Ultimately, a best file may be generated at 230 and loaded at 270.

Figure 3:
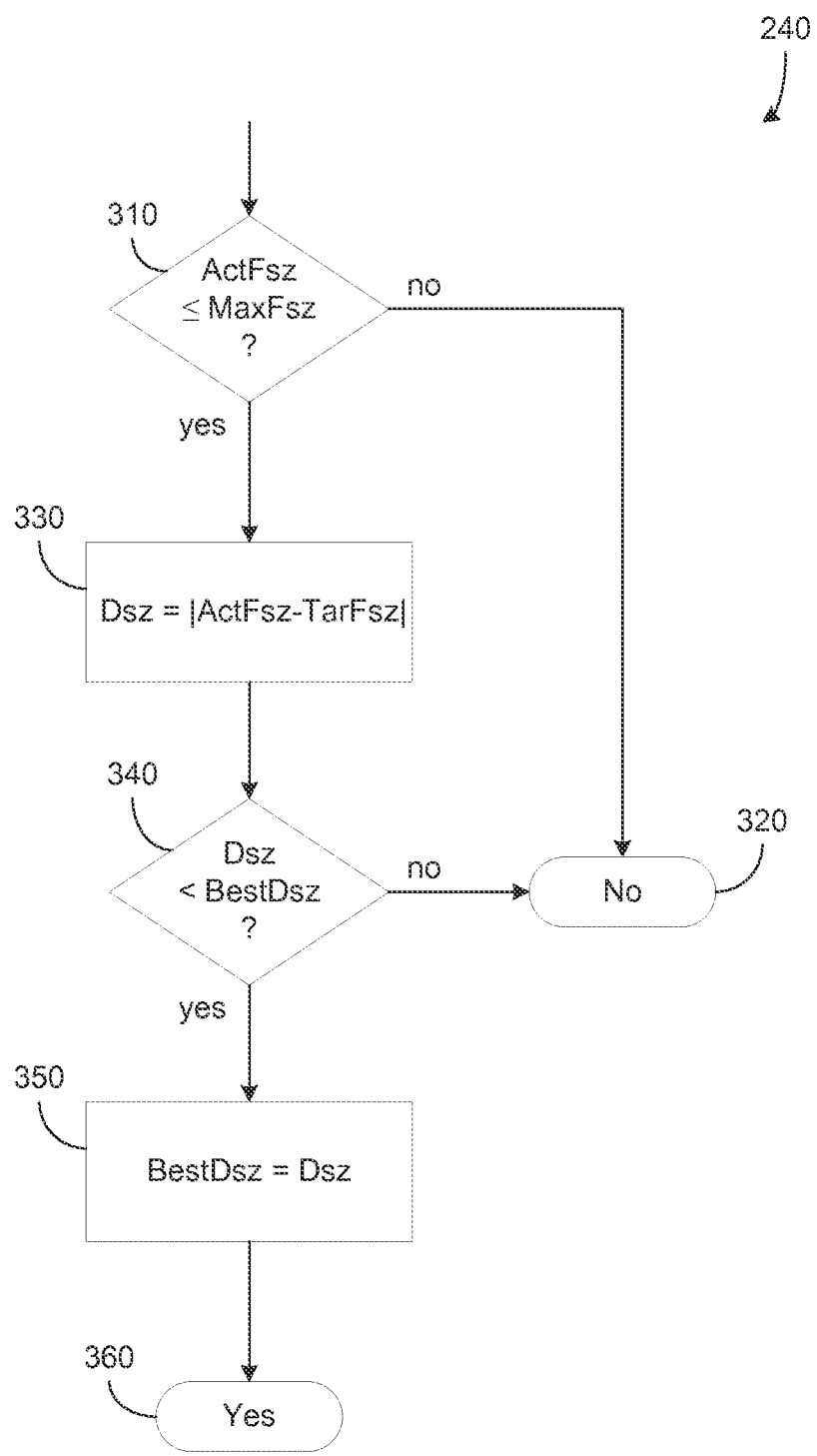
FIG. 3 is a flow chart illustrating a process for determining if a frame has the best size, according to an embodiment.

The determination as to whether a file has the best size so far (240 in FIG. 2) is illustrated in FIG. 3 according to an embodiment. At 310, the actual file size ActFsz of the most recently generated file may be compared to a maximum permissible file size, MaxFsz. If ActFsz is less than or equal to MaxFsz, then processing may continue at 330. Otherwise, ActFsz is greater than MaxFsz, and at 320, ActFsz may not be treated as the best file size so far.

At 330, a delta value Dsz may be calculated as the absolute difference between ActFsz and a target file size TarFsz. At 340, a determination may be made as to whether Dsz is less than the delta between the size of the current best file and TarFsz. If not, then at 320, ActFsz may not be treated as a best file size so far. If, however, Dsz is less than the delta between a size of the current best file and TarFsz, then ActFsz may be closer to TarFsz than the size of the current best file. As a result, at 350, the value Dsz may be assigned to BestDsz, and the most recently generated file may be treated as the current best file at 360.

Figure 4:
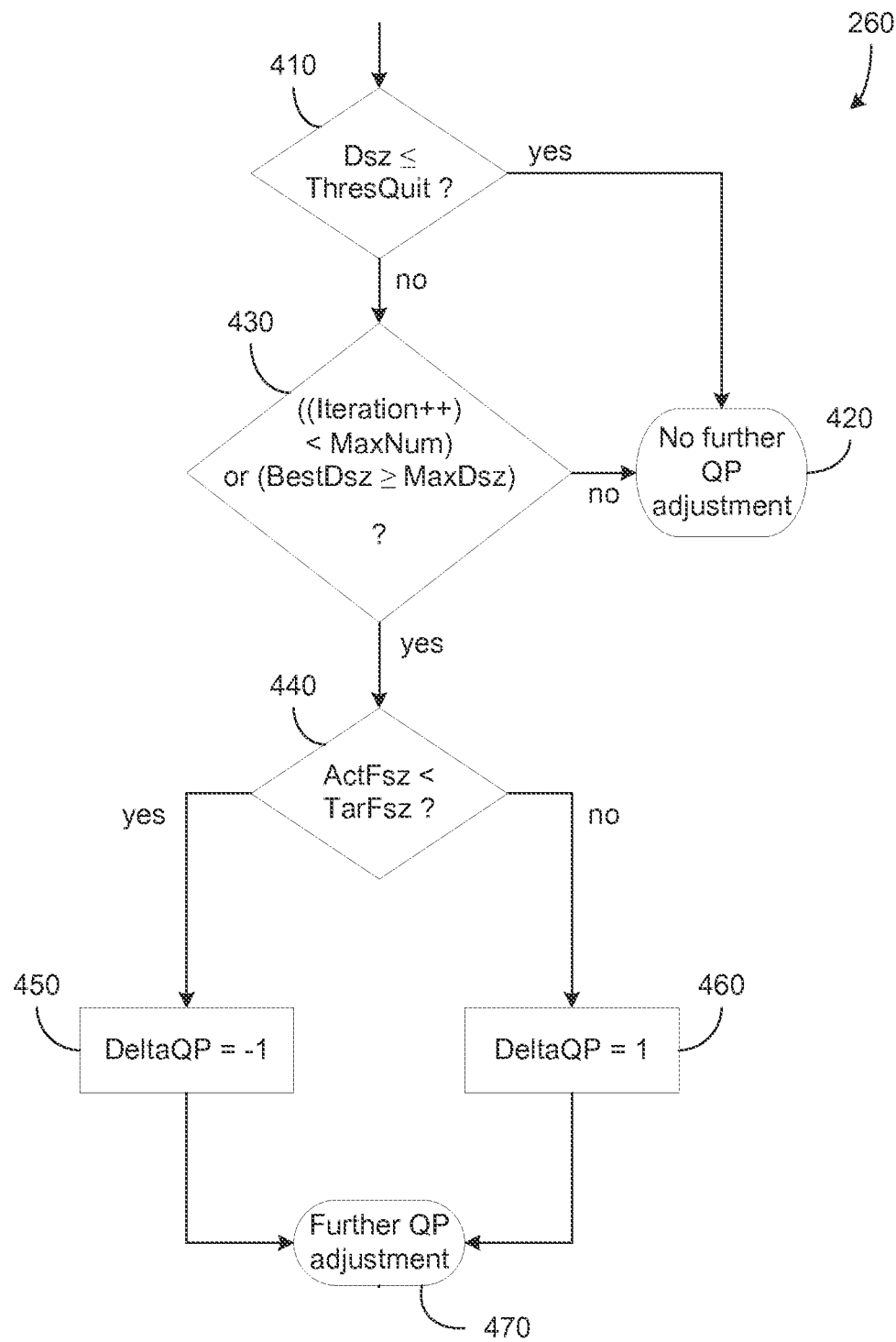
FIG. 4 is a flow chart illustrating a process for determining it a QP needs to be adjusted and how it should be adjusted, according to an embodiment.

A determination as to whether the QP needs to be adjusted is illustrated in FIG. 4, according to an embodiment. At 410, a determination may be made as to whether Dsz is less than or equal to a threshold value ThresQuit. This latter value may represent a point at which the current best file may be treated as acceptable in size. Such a threshold value may be provided by a user, may be set to zero by default. If this condition is met, then it may be determined at 420 that no further QP adjustment is necessary.

At 430, a Boolean OR expression may be evaluated, consisting of two separate conditions. For the first, iterations of the QP adjustment process may be counted, and the incremented value for this count (iteration++) may be compared to a maximum value for the number of iterations, MaxNum. In the other condition, BestDsz is compared to a maximum allowable value for the delta file size, MaxDsz, If the incremented value of the iteration count is less than MaxNum, then the maximum has not been reached, and processing may continue to 440. If the value BestDsz is greater than or equal to MaxDsz, then another iteration may be called for, and processing may continue to 440. If both conditions are false, the incremented value of the iteration count has reached the limit MaxNum and BestDsz is less than MaxDsz, and at 420 no further QP adjustment may be necessary.

At 440, a determination may be made as to whether the actual file size is less than the target file size, i.e., whether ActFsz is less than TarFsz. If so, then the QP should be decremented, so the change to the QP, DeltaQP, may be set to −1 at 450. If ActFsz is not less than TarFsz, then the QP should be incremented and so DeltaQP may be set to +1 at 460.

Figure 5:
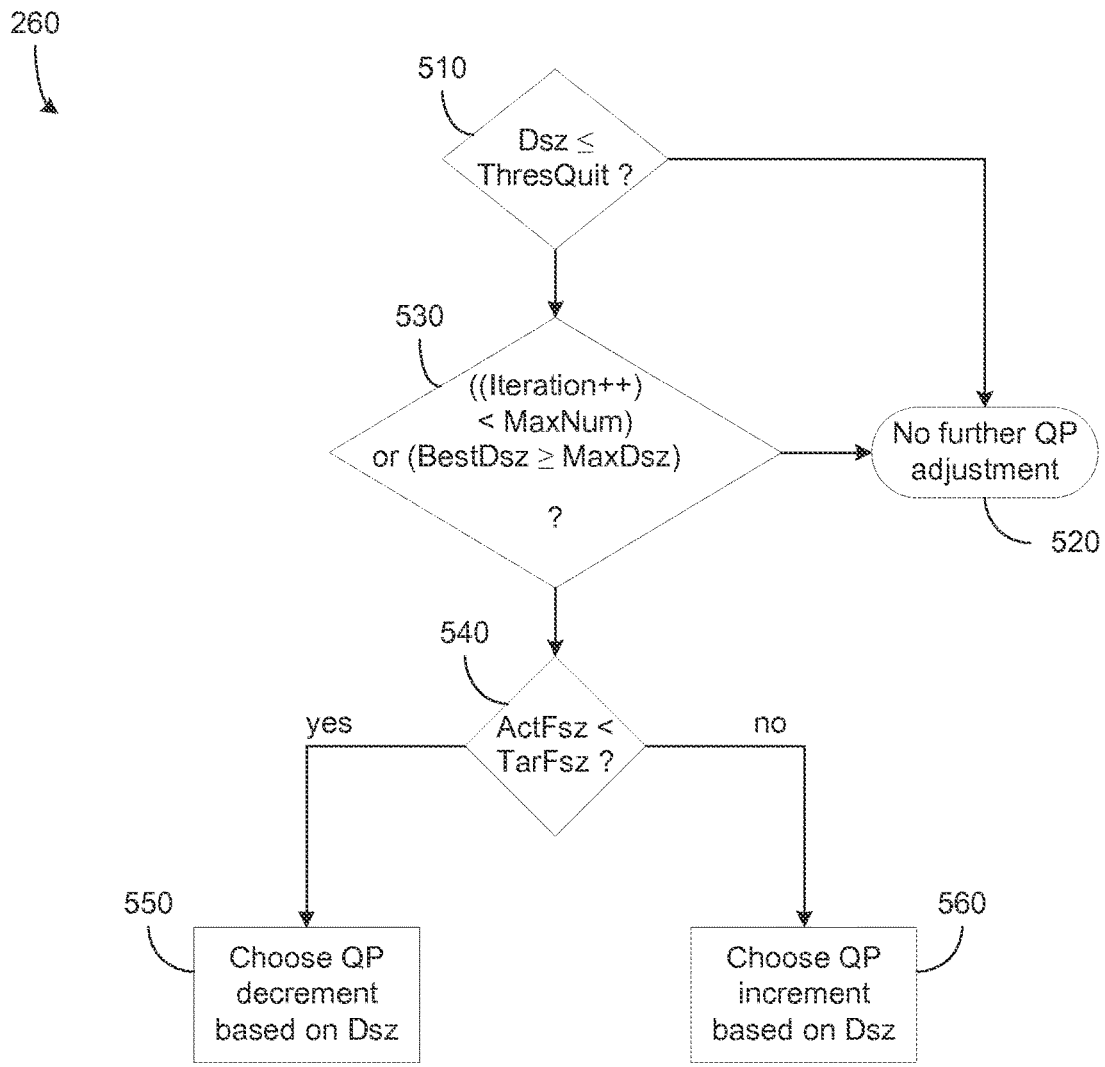
FIG. 5 is a flow chart illustrating a process for determining if a QP needs to be adjusted and how it should be adjusted, according to another embodiment.

In an embodiment, the amount by which the QP is adjusted in any given iteration may depend on the magnitude of Dsz. Therefore, if Dsz is large, i.e., the actual file size ActFsz differs from the target file size TarFsz by a relatively larger amount, then QP may be increased or decreased by a larger amount. Such an embodiment is shown in FIG. 5. At 510, a determination may be made as to whether Dsz is less than or equal to the threshold value ThresQuit. If this condition is met, then at 520 that no further QP adjustment is necessary. At 530, a Boolean OR expression may be evaluated, consisting of two separate conditions as noted above. For the first, iterations of the QP adjustment process may be counted, and the incremented value for this count (iteration++) may be compared to MaxNum. In the other condition, BestDsz is compared to MaxDsz. If the incremented value of the iteration count is less than MaxNum, then the maximum has not been reached, and processing may continue to 540. If the value BestDsz is greater than or equal to MaxDsz, then another iteration may be called for, and processing may continue to 540. If both conditions of 530 are false, the incremented value of the iteration count has reached the limit MaxNum and BestDsz is less than MaxDsz, and at 520 further QP adjustment may not be necessary. At 540, a determination may be made as to whether ActFsz is less than TarFsz. At 550, an amount for a QP decrement may be chosen based on the size of Dsz if ActFsz is less than TarFsz. Otherwise, at 560 an amount for a QP increment is chosen based on the size of Dsz.

Figure 6:
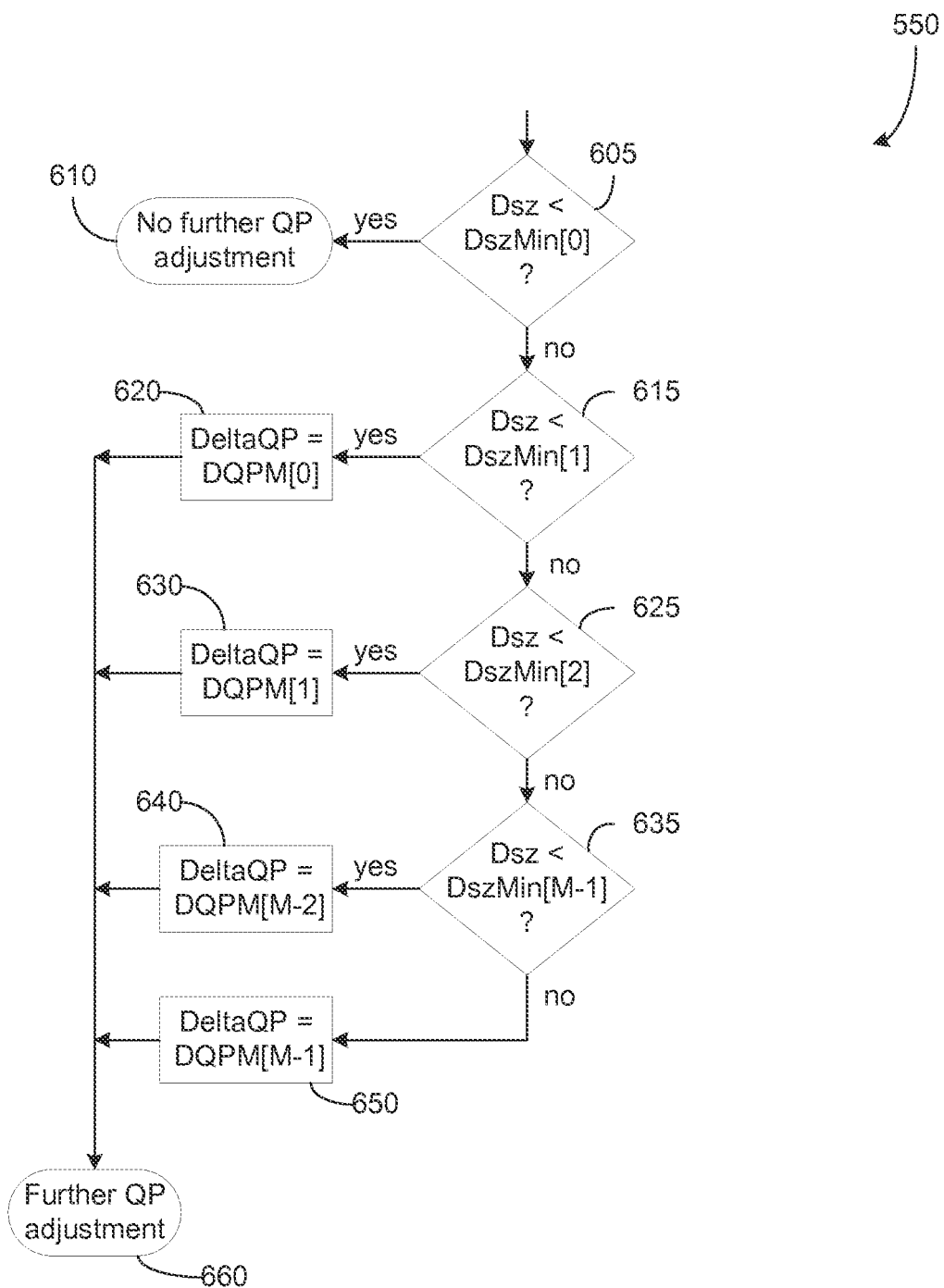
FIG. 6 is a flow chart illustrating a process for determining how much to adjust a QP, given that the QP needs to be decremented, according to another embodiment.

The choice of an appropriate size of a decrement for QP (550 of FIG. 5) is illustrated in FIG. 6, according to an embodiment. Here, two sets of values may be used. The first is a set of M threshold values for Dsz. This set of threshold values is shown as DszMin[0], . . . DszMin[M−1]. In an embodiment, M may be set to 4, and DszMin[0], . . . DszMin[M−1]={TarFzs/16, TarFzs/8, TarFzs/4, TarFzs/2}. As will be discussed below, in this embodiment, if Dsz is less than DszMin[0](i.e., less than TarFsz/16 in this embodiment, a relatively small threshold), then no further QP adjustment may be needed. If Dsz has a larger value, but Dsz is still less than DszMin[1] (i.e., TarFsz/8 in this embodiment), then the QP may be decremented by a non-zero value. If Dsz is still larger as compared to the other values in the set DszMin, then the QP may be decremented by a still larger value.

The second set of values may represent the amounts by which the QP may be decremented. This latter set is shown as DQPM[0] . . . DQPM[M−1], where these values may be successively larger in absolute value. Where i is less than j, |DQPM[i]| may be less than |DQPM[j]|. Values in the set DQPM may be negative to reflect the fact that they may be used to decrement the QP.

At 605, a determination may be made as to whether Dsz is less than DszMin[0]. If so, then Dsz is sufficiently small and there may be no need for further adjustment of the QP. Otherwise, the process may continue to 615. Here, a determination may be made as to whether Dsz is less than DszMin[1]. If so, then at 620 DeltaQP is assigned a non-zero value DQPM[0]. If Dsz is not less than DszMin[1], then the process may continue at 625, where Dsz may be compared to DszMin[2]. If Dsz is less than DszMin[2], then at 630 DeltaQP may be assigned the value DQPM[1]. Otherwise, the process may continue at 635, where Dsz may be compared to DszMin[M−1]. If Dsz is less than DszMin[M−1], then at 640 DeltaQP may be assigned the value DQPM[M−2]. Otherwise, the process may continue at 650, where DeltaQP may be assigned the value DQPM[M−1]. Once DeltaQP has been assigned a value at 620, 630, 640 or 650, at 660 the QP may be adjusted accordingly by application of DeltaQP.

Figure 7:
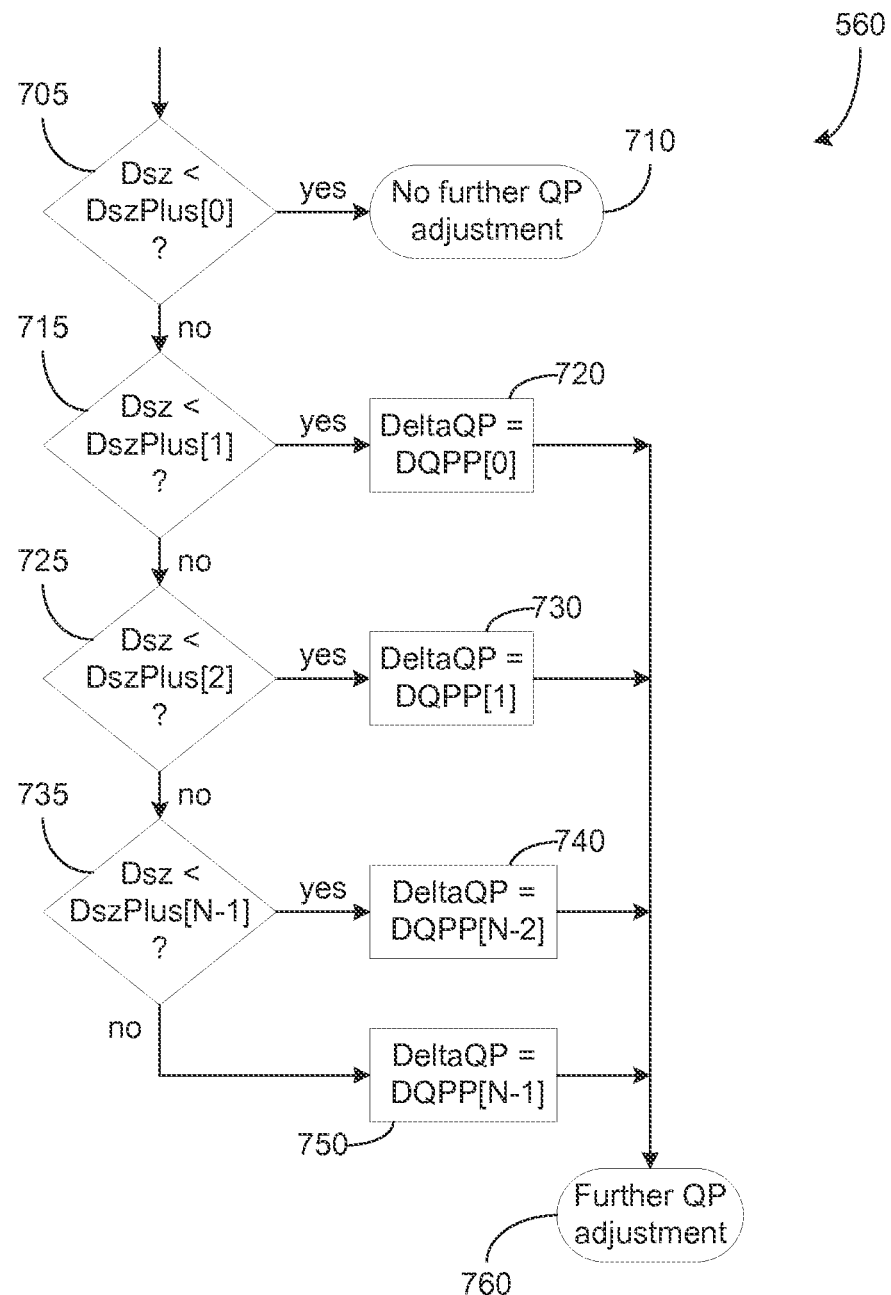
FIG. 7 is a flow chart illustrating a process for determining how much to adjust a QP, given that the QP needs to be incremented, according to another embodiment.

The choice of an appropriate size of an increment for QP (560 of FIG. 5) is illustrated. in FIG. 7, according to an embodiment. The processing here may be analogous to that of FIG. 6, according to an embodiment. Here, two sets of values may be used. The first is a set of N threshold values for Dsz. This set of threshold values is shown as DszPlus[0], . . . DszPlus[N−1]. In an embodiment, N may be set to 4, and DszPlus[0], . . . DszPlus[N−1]={TarFzs/8, TarFzs/4, TarFzs/2, TarFzs/1}. As will be discussed below, in this embodiment, if Dsz is less than DszPlus[0], i.e., TarFsz/8 in this embodiment, then no further QP adjustment may be needed. If Dsz has a larger value, but Dsz is still less that. DszPlus[1] (i.e., TarFsz/4 in this embodiment), then the QP may be incremented by a. non-zero value. If Dsz is still larger as compared to the other values in the set DszPlus, then the QP may be incremented by a still larger value. The second set of values may represent the amounts by which the QP may be incremented. This latter set is shown as DQPP[0] . . . DQPP[N−1], where these values may be successively larger, If i is less than j, then DQPP[i] may be less than DQPP[j].

At 705, a determination may he made as to whether Dsz is less than DszPlus[0]. If so, then Dsz is sufficiently small and at 710 there may be no further adjustment of the QP. Otherwise, the process may continue to 715. Here, a determination may he made as to whether Dsz is less than DszPlus[1]. If so, then at 720 DeltaQP is assigned a non-zero value DQPP[0]. If Dsz is not less than DszPlus[1], then the process may continue at 725, where Dsz may be compared to DszPlus[2]. If Dsz is less than DszPlus[2], then at 730 DeltaQP may be assigned the value DQPP[1]. Otherwise, the process may continue at 635, where Dsz may be compared to DszPlus[N−1]. If Dsz is less than DszPlus[N−1], then at 740 DeltaQP may be assigned the value DQPP[N−2]. Otherwise, the process may continue at 750, where DeltaQP may be assigned the value DQPP[N−1]. Once DeltaQP has been assigned a value at 720, 730, 740 or 750, then at 760 the QP may he adjusted accordingly by adding DeltaQP to QP.

One or more features disclosed herein may be implemented in hardware, software, firmware, and combinations thereof, including discrete and integrated circuit logic, application specific integrated circuit (ASIC) logic, and microcontrollers, and may be implemented as part of a domain-specific integrated circuit package, or a combination of integrated circuit packages. The term software, as used herein, refers to a computer program product including a computer readable medium having computer program logic stored therein to cause a computer system to perform one or more features and/or combinations of features disclosed herein, The computer readable medium may be transitory or non-transitory. An example of a transitory computer readable medium may be a digital signal transmitted over a radio frequency or over an electrical conductor, through a local or wide area network, or through a network such as the Internet. An example of a non-transitory computer readable medium may be a compact disk, a flash memory, or other data storage device.

A software embodiment of the system described above is illustrated in FIG. 8, according to an embodiment. The illustrated system 800 may include one or more programmable processor(s) 820 that may execute the functionality described above. The system 800 may further include a body of memory 810. Processor(s) 820 may include a central processing unit (CPU) and/or a graphics processing unit (GPU). Memory 810 may include one or more computer readable media that may store computer program logic 840. Memory 810 may be implemented as a hard disk and drive, a removable media such as a compact disk, a read-only memory (ROM) or random access memory (RAM) device, for example, or some combination thereof. Programmable processor(s) 820 and memory 810 may be in communication using any of several technologies known to one of ordinary skill in the art, such as a bus. Computer program logic 840 contained in memory 810 may be read and executed by processor(s) 820. One or more I/O ports and/or I/O devices, shown collectively as I/O 830, may also be connected to processor(s) 820 and memory 810.

Figure 8:
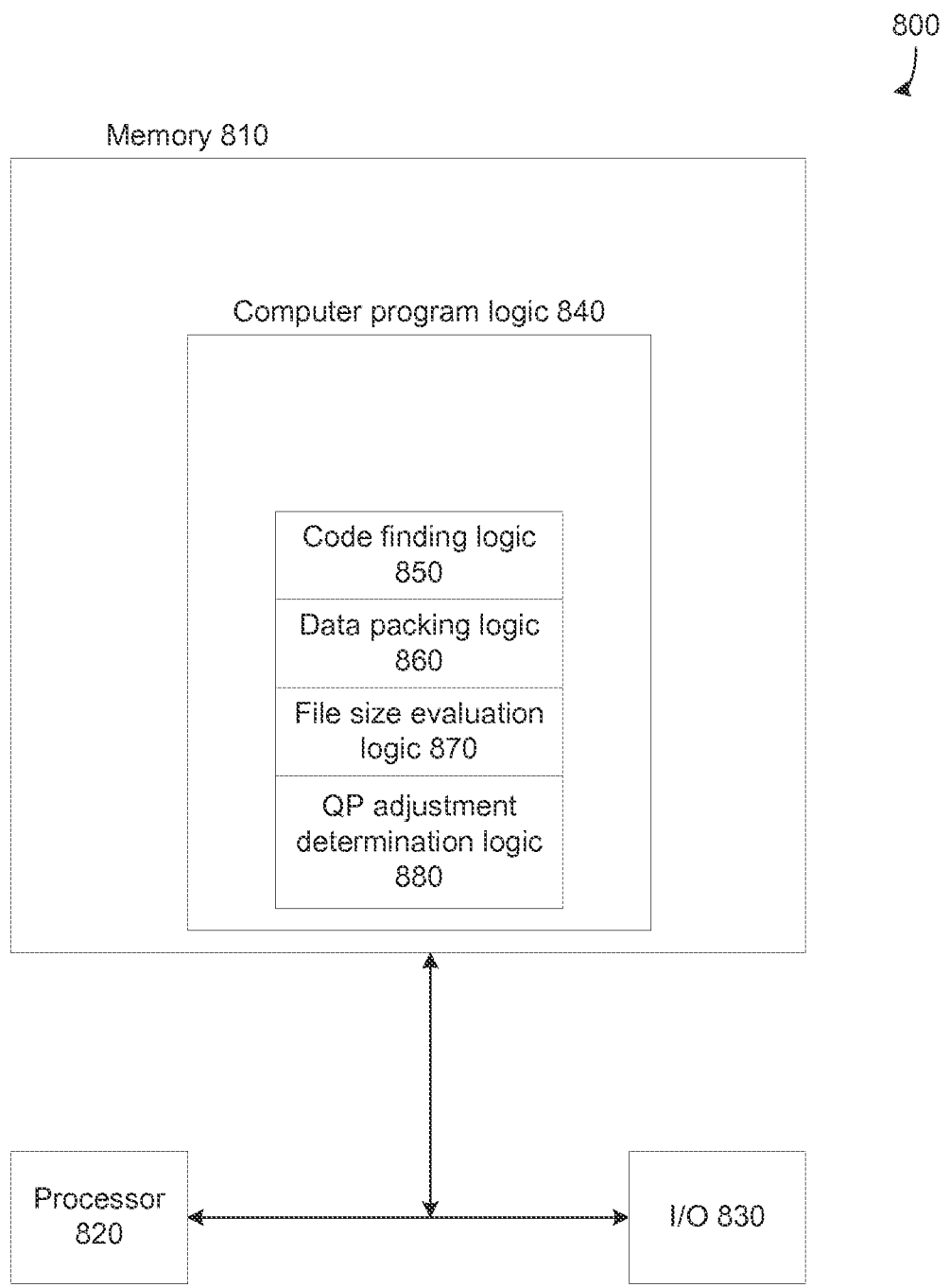
FIG. 8 is a block diagram illustrating a software or firmware embodiment of the functionality described herein, according to an embodiment.

In the embodiment of FIG. 8, computer program logic 840 in the video processor may include code finding logic 850, which may be responsible for searching for and determining macroblock prediction codes for one or more input video frames. Computer program logic 840 may also include data packing logic 860, which may be responsible for calculating and quantizing the remaining residue data from the input video frame(s), and packing the data into a bitstream using a QP. As noted above, in an embodiment entropy coding may be used in this process. Program logic 840 may also include file size evaluation logic 870, which may be responsible for determining whether a file has the best size so far, where the frame was generated using a particular QP. The functionality of logic 870 is illustrated in FIG. 3 according to an embodiment. Program logic 840 may also include QP adjustment determination logic 880. Logic 880 may be responsible fur determining if a QP needs to be adjusted and by how much. The functionality of logic 880 is illustrated in FIGS. 4-7, according to embodiments.

The systems, methods and computer program products described above may be incorporated into any device or system that performs video encoding, In one embodiment, for example, the systems, methods and computer program products described above may be incorporated in a communication system. In various embodiments, such a system may comprise a processing system, computing system, mobile computing system, mobile computing device, mobile wireless device, computer, computer platform, computer system, computer sub-system, server, workstation, terminal, personal computer (PC), laptop computer, ultra-laptop computer, portable computer, handheld computer, personal digital assistant (PDA), cellular telephone, combination cellular telephone/PDA, smart phone, pager, one-way pager, two-way pager, messaging device, blackberry, MID, MP3 player, and so forth. The embodiments are not limited in this context.

In one embodiment, systems 200 and 800 may be implemented as part of a wired communication system, a wireless communication system, or a combination of both. In one embodiment, for example, systems 200 and 800 may be implemented in a mobile computing device having wireless capabilities. A mobile computing device may refer to any device having a processing system and a mobile power source or supply, such as one or more batteries, for example.

Methods and systems are disclosed herein with the aid of functional building blocks illustrating the functions, features, and relationships thereof. At least some of the boundaries of these functional building blocks have been arbitrarily defined herein for the convenience of the description. Alternate boundaries may be defined so long as the specified functions and relationships thereof are appropriately performed.

White various embodiments are disclosed herein, it should be understood that they have been presented by way of example only, and not limitation. It will be apparent to persons skilled in the relevant art that various changes in form and detail may be made therein without departing from the spirit and scope of the methods and systems disclosed herein. Thus, the breadth and scope of the claims should not be limited by any of the exemplary embodiments disclosed herein.

What is claimed is:

1. A video encoding method, comprising:
   determining, in a video encoder, one or more macroblock prediction codes for a video frame to be encoded;

quantizing residue data remaining from said determination based on a quantization parameter (QP); 
packing the quantized residue into a bitstream; and 
evaluating a difference between an actual file size that results from said packing and a target file size; 
selecting, in response to the actual file size being smaller than the target file size, a QP value decrement from a set of predetermined decrements based on a comparison of the difference to a set of first difference thresholds that are each associated with one of the predetermined decrements, and selecting, in response to the actual file size being larger than the target file size, a QP value increment from a set of predetermined increments based on a comparison of the difference to a set of second difference thresholds that are each associated with one of the predetermined increments, wherein: 
  the set of first difference thresholds includes at least four thresholds equal to different fractions of the target file size between one-sixteenth and one-half of the target file size; 
  the set of second difference thresholds includes at least four thresholds equal to different fractions of the target file size between one-eighth of the target file size and the target file size; and 
  a magnitude of the QP value increment and decrement increases with a magnitude of the first and second difference thresholds; 
modifying the value of the QP by the selected QP value decrement or increment; and 
repeating said quantization, with the modified QP value, and said packing, without repeating said determination.

2. The method of claim 1, wherein: 
said packing of the quantized residue is performed using entropy coding; and 
said repeating is halted if a number of iterations reaches a predetermined maximum number of iterations or the determined difference satisfies a smallest of the difference thresholds.

3. A system, comprising: 
a processor; and 
a memory in communication with said processor, said memory for storing a plurality of processing instructions configured to direct said processor to: 
determine one or more macroblock prediction codes for a video frame to be encoded; 
quantize residue data remaining from said determination based on a quantization parameter (QP); 
pack the quantized residue into a bitstream; and 
evaluate a difference between an actual file size packed and a target file size; 
select, in response to the actual file size being smaller than the target file size, a QP value decrement from a set of predetermined decrements based on a comparison of the difference to a set of first difference thresholds that are each associated with one of the predetermined decrements, and select, in response to the actual file size being larger than the target file size, a QP value increment from a set of predetermined increments based on a comparison of the difference to a set of second difference thresholds that are each associated with one of the predetermined increments, wherein: 
  the set of first difference thresholds includes at least four thresholds equal to different fractions of the target file size between one-sixteenth and one-half of the target file size; 
  the set of second difference thresholds includes at least four thresholds equal to different fractions of the target file size between one-eighth of the target file size and the target file size; and 
  a magnitude of the QP value increment and decrement increases with a magnitude of the first and second difference thresholds; 
modify the value of the QP by the selected QP value decrement or increment; and 
repeat said quantization, with the modified QP value, and said packing, without repeating said determination.

4. The system of claim 3, wherein: 
said processor is to pack using entropy coding; and 
the processor is to halt repetition of quantization if a number of iterations reaches a predetermined maximum number of iterations or the determined difference satisfies a smallest of the difference thresholds.

5. A non-transitory computer readable medium, having control logic instructions stored therein, to cause a processor to perform a video encoding method, comprising: 
determining one or more macroblock prediction codes for a video frame to be encoded; 
quantizing residue data remaining from said determination based on a quantization parameter (QP); 
packing the quantized residue into a bitstream; 
evaluating a difference between an actual file size that results from said packing and a target file size; 
selecting, in response to the actual file size being smaller than the target file size, a QP value decrement from a set of predetermined decrements based on a comparison of the difference to a set of first difference thresholds that are each associated with one of the predetermined decrements, and selecting, in response to the actual file size being larger than the target file size, a QP value increment from a set of predetermined increments based on a comparison of the difference to a set of second difference thresholds that are each associated with one of the predetermined increments, wherein: 
  the set of first difference thresholds includes at least four thresholds equal to different fractions of the target file size between one-sixteenth and one-half of the target file size; 
  the set of second difference thresholds includes at least four thresholds equal to different fractions of the target file size between one-eighth of the target file size and the target file size; and 
  a magnitude of the QP value increment and decrement increases with a magnitude of the first and second difference thresholds; 
modifying the value of the QP by the selected QP value decrement or increment; and 
repeating said quantization, with the modified QP value, and said packing, without repeating said determination.

6. The medium of claim 5, wherein: 
said packing of the quantized residue is performed using entropy coding; and 
said repeating is halted if a number of iterations reaches a predetermined maximum number of iterations or the determined difference satisfies a smallest of the difference thresholds.

* * * * *